United States Patent
Conticelli et al.

(10) Patent No.: US 7,710,749 B2
(45) Date of Patent: May 4, 2010

(54) METHOD FOR OPERATING A CONVERTER CIRCUIT

(75) Inventors: Fabio Conticelli, Baden-Dättwil (CH); Patrick Bohren, Lenzburg (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 12/343,053

(22) Filed: Dec. 23, 2008

(65) Prior Publication Data

US 2009/0147540 A1    Jun. 11, 2009

Related U.S. Application Data

(63) Continuation of application No. PCT/EP2007/055729, filed on Jun. 12, 2007.

(30) Foreign Application Priority Data

Jun. 23, 2006    (EP) ................... 06405268

(51) Int. Cl.
    *H02M 1/12* (2006.01)
(52) U.S. Cl. .......................................... 363/40; 363/97
(58) Field of Classification Search .................. 363/40, 363/41, 97
    See application file for complete search history.

(56) References Cited

U.S. PATENT DOCUMENTS

| 6,052,297 | A | 4/2000 | Akamatsu et al. |
| 6,201,715 | B1 | 3/2001 | Huggett et al. |
| 6,847,194 | B2 * | 1/2005 | Sarlioglu et al. .............. 322/10 |

OTHER PUBLICATIONS

International Preliminary Report on Patentability and Written Opinion (Forms PCT/IB/326, PCT/IB/373 and PCT/ISA/237) issued in corresponding PCT/EP2007/055729, Jan. 15, 2009, The International Bureau of WIPO, Geneva, CH; and English-language translation thereof.
International Search Report (PCT/ISA/210).
European Search Report.

* cited by examiner

*Primary Examiner*—Shawn Riley
(74) *Attorney, Agent, or Firm*—Buchanan Ingersoll & Rooney PC

(57) ABSTRACT

A method and arrangement are disclosed for operating a converter circuit. Such a converter circuit has a converter unit having a multiplicity of drivable power semiconductor switches. The converter unit is connected to an electrical AC voltage supply system on the AC voltage side. The drivable power semiconductor switches are driven by means of a drive signal formed from reference voltages ($u^*Na$, $u^*Nb$, $u^*Nc$). The reference voltages ($u^*Na$, $u^*Nb$, $u^*Nc$) are formed from a periodic modulation index and from a periodic modulation angle.

9 Claims, 1 Drawing Sheet

METHOD FOR OPERATING A CONVERTER CIRCUIT

RELATED APPLICATIONS

This application claims priority under 35 U.S.C. §119 to EP Application 06405268.1 filed in Europe on Jun. 23, 2006, and as a continuation application under 35 U.S.C. §120 to PCT/EP2007/055729 filed as an International Application on Jun. 12, 2007 designating the U.S., the entire contents of which are hereby incorporated by reference in their entireties.

TECHNICAL FIELD

The disclosure relates to the field of power electronics. It proceeds from a method for operating a converter circuit.

BACKGROUND INFORMATION

Conventional converter circuits comprise a converter unit having a multiplicity of drivable power semiconductor switches which are connected up in a known manner for switching at least two switching voltage levels. On the AC voltage side, the converter unit is connected to an electrical AC voltage supply system. Furthermore, a capacitive energy store is connected to the converter unit, said store conventionally being formed by one or a plurality of capacitors. A drive device is provided for the operation of the converter circuit, said drive device driving the drivable power semiconductor switches by means of a drive signal in method terms during the operation of the converter circuit. The drive signal is typically formed from reference voltages, wherein an assignment unit is provided for forming the drive signal, said assignment unit assigning corresponding drive signal values to the reference voltages. The corresponding reference voltage is the voltage which is set by the converter unit at the associated phase output of the converter unit, and typically corresponds to the associated phase voltage, such that the converter unit sets voltages corresponding to the phase voltages of the electrical AC voltage supply system at its phase outputs. In this case, it is unimportant whether symmetrical or asymmetrical phase voltages are present. Asymmetrical phase voltages are present for example at different phase angles of the phase voltages with respect to one another and/or at different amplitudes of the phase voltages with respect to one another and/or at different frequencies of the phase voltages with respect to one another. In accordance with the prior art, each reference voltage is formed from a constant modulation index assigned to it and a constant modulation angle assigned to it. Consequently, for example in the case of a three-phase electrical AC voltage supply system with three phase voltages, three reference voltages are also necessary and thus also three independent constant modulation indexes and three independent constant modulation angles, wherein these constant modulation indexes and these constant modulation angles are typically formed by calculation, whereby an enormous computational complexity arises. Accordingly, the operation of the converter circuit is very complex, inefficient, expensive and susceptible to faults, whereby the availability of the converter circuit decreases hugely and the maintenance of the converter circuit increases significantly.

SUMMARY

A method is disclosed for operating a converter circuit by means of which the converter circuit can be operated very simply and efficiently.

A method for operating a converter circuit is disclosed, wherein the converter circuit has a converter unit (1) having a multiplicity of drivable power semiconductor switches and the converter unit (1) is connected to an electrical AC voltage supply system (2) on the AC voltage side, in which the drivable power semiconductor switches are driven by means of a drive signal (S) formed from reference voltages ($u^*_{Na}$, $u^*_{Nb}$, $u^*_{Nc}$), wherein the reference voltages ($u^*_{Na}$, $u^*_{Nb}$, $u^*_{Nc}$) are formed from a periodic modulation index ($m(t)$) and from a periodic modulation angle ($\theta(t)$), and wherein the periodic modulation index ($m(t)$) and the periodic modulation angle ($\theta(t)$) are formed in each case from the d component of the Park-Clarke transformation of the positive sequence of the phase voltages ($U_{Ndp}$), from the q component of the Park-Clarke transformation of the positive sequence of the phase voltages ($U_{Nqp}$), from the d component of the Park-Clarke transformation of the negative sequence of the phase voltages ($U_{Ndn}$) and from the q component of the Park-Clarke transformation of the negative sequence of the phase voltages ($U_{Nqn}$).

In another aspect, a converter circuit arrangement is disclosed. Such an arrangement comprises a converter unit having a multiplicity of drivable power semiconductor switches, the drivable power semiconductor switches being driven by a drive signal (S) formed from reference voltages ($u^*_{Na}$, $u^*_{Nb}$, $u^*_{Nc}$); and an electrical AC voltage supply system connected to an AC voltage side of the converter unit. The reference voltages ($u^*_{Na}$, $u^*_{Nb}$, $u^*_{Nc}$) are formed from a periodic modulation index ($m(t)$) and from a periodic modulation angle ($\theta(t)$). The periodic modulation index ($m(t)$) and the periodic modulation angle ($\theta(t)$) are formed in each case from the d component of the Park-Clarke transformation of the positive sequence of the phase voltages ($U_{Ndp}$), from the q component of the Park-Clarke transformation of the positive sequence of the phase voltages ($U_{Nqp}$), from the d component of the Park-Clarke transformation of the negative sequence of the phase voltages ($U_{Ndn}$) and from the q component of the Park-Clarke transformation of the negative sequence of the phase voltages ($U_{Nqn}$).

These and further objects, advantages and features of the present disclosure will become apparent from the following detailed description of exemplary embodiments of the disclosure in conjunction with the drawing.

BRIEF DESCRIPTION OF THE DRAWING

In the drawing.

The reference symbols used in the drawing and their meaning are summarized in the List of reference symbols. In principle, identical parts are provided with identical reference symbols in the FIGURE. The embodiment described should be understood as an example, having no restrictive effect.

DETAILED DESCRIPTION

Figure 1:
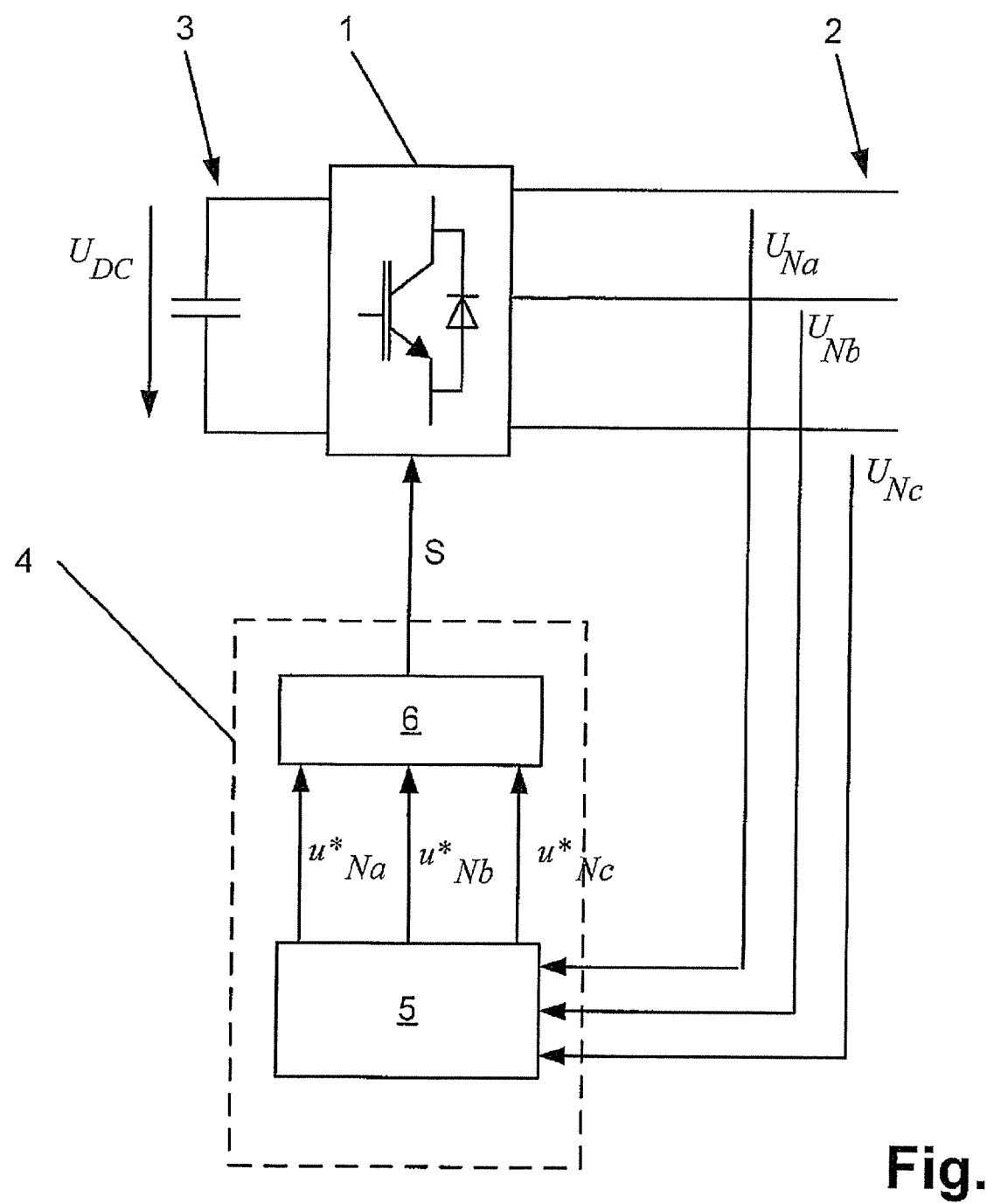
FIG. 1 shows an exemplary embodiment of a converter circuit which is operated by the method according to the disclosure.

In the method according to the disclosure for operating a, converter circuit, the converter circuit has a converter unit having a multiplicity of drivable power semiconductor switches, wherein the converter unit is connected to an electrical AC voltage supply system on the AC voltage side and the drivable power semiconductor switches are driven by means of a drive signal formed from reference voltages. According to the disclosure, the reference voltages are formed from a periodic modulation index and from a periodic modulation angle, wherein the periodic modulation index and the periodic modulation angle are formed in each case from the d component of the Park-Clarke transformation of the positive sequence of the phase voltages, from the q component of the Park-Clarke transformation of the positive sequence of the phase voltages, from the d component of the Park-Clarke transformation of the negative sequence of the phase voltages and from the q component of the Park-Clarke transformation of the negative sequence of the phase voltages. By virtue of the fact that the reference voltages are merely formed from a, in particular from a single, periodic modulation index and from a, in particular from a single, periodic modulation angle, which periodic modulation index and periodic modulation angle formed in each case from the d component of the Park-Clarke transformation of the positive sequence of the phase voltages, from the q component of the Park-Clarke transformation of the positive sequence of the phase voltages, from the d component of the Park-Clarke transformation of the negative sequence of the phase voltages and from the q component of the Park-Clarke transformation of the negative sequence of the phase voltages, advantageously only a very low computational complexity is required for forming the reference voltages. The converter circuit can therefore be operated particularly simply and efficiently by the method according to the disclosure, in which case, moreover, a low susceptibility to faults and hence a high availability of the converter circuit in association with a low maintenance outlay can be achieved.

An exemplary embodiment of a converter circuit is shown in FIG. 1. The converter circuit comprises a converter unit 1 for switching at least two switching voltage levels. On the AC voltage side, the converter unit 1 is connected to an electrical AC voltage supply system 2. Furthermore, a capacitive energy store 3 is connected to the converter unit 1, said store typically being formed by one or a plurality of capacitors. A drive device 4 is provided for the operation of the converter circuit, said drive device driving the drivable power semiconductor switches by means of a drive signal S in method terms during the operation of the converter circuit. The drive signal S is typically formed from reference voltages $u^*_{Na}$, $u^*_{Nb}$, $u^*_{Nc}$, wherein an assignment unit 6 is provided for forming the drive signal S, said assignment unit assigning corresponding drive signal values to the reference voltages $u^*_{Na}$, $u^*_{Nb}$, $u^*_{Nc}$.

With regard to the method according to the disclosure for operating such a converter circuit, the reference voltages $u^*_{Na}$, $u^*_{Nb}$, $u^*_{Nc}$ are formed from a periodic modulation index m(t) and from a periodic modulation angle θ(t). Accordingly, both the periodic modulation index m(t) and the periodic modulation angle θ(t) are a function of the time t and thus time-dependent, in particular. The periodic modulation index m(t) and the periodic modulation angle θ(t) are formed in each case from the d component of the Park-Clarke transformation of the positive sequence of the phase voltages $U_{Ndp}$, from the q component of the Park-Clarke transformation of the positive sequence of the phase voltages $U_{Nqp}$, from the d component of the Park-Clarke transformation of the negative sequence of the phase voltages $U_{Ndn}$ and from the q component of the Park-Clarke transformation of the negative sequence of the phase voltages $U_{Nqn}$. By virtue of the fact that the reference voltages $u^*_{Na}$, $u^*_{Nb}$, $u^*_{Nc}$ are merely formed from a, in particular from a single, periodic modulation index m(t) and from a, in particular from a single, periodic modulation angle θ(t) and the periodic modulation index m(t) and also the periodic modulation angle θ(t) are formed in each case from the d component of the Park-Clarke transformation of the positive sequence of the phase voltages $U_{Ndp}$, from the q component of the Park-Clarke transformation of the positive sequence of the phase voltages $U_{Nqp}$, from the d component of the Park-Clarke transformation of the negative sequence of the phase voltages $U_{Ndn}$ and from the q component of the Park-Clarke transformation of the negative sequence of the phase voltages $U_{Nqn}$, advantageously only a very low computational complexity is required for forming the reference voltages $u^*_{Na}$, $u^*_{Nb}$, $u^*_{Nc}$. Accordingly, the converter circuit can be operated very simply and efficiently by the method according to the disclosure, in which case a low susceptibility to faults and hence a high availability of the converter circuit in association with a low maintenance outlay can furthermore be achieved. By comparison with the prior art, for example in the case of a three-phase electrical AC voltage supply system, it is no longer necessary to form three independent constant modulation indexes and three independent constant modulation angles, but rather now just one periodic modulation index m(t) and one periodic modulation angle θ(t).

The periodic modulation index m(t) and the periodic modulation angle θ(t) are formed in particular in the drive device 4 as follows, in particular by calculation:

$$m(t) = \frac{\sqrt{(U_{Ndp} + \cos(2\omega t) \cdot U_{Ndn} + \sin(2\omega t) \cdot U_{Nqn})^2 + (U_{Nqp} + \cos(2\omega t) \cdot U_{Nqn} - \sin(2\omega t) \cdot U_{Ndn})^2}}{U_{DC}/2}$$

$$\theta(t) = \arctan\left(\frac{U_{Nqp} + \cos(2\omega t) \cdot U_{Nqn} - \sin(2\omega t) \cdot U_{Ndn}}{U_{Ndp} + \cos(2\omega t) \cdot U_{Ndn} + \sin(2\omega t) \cdot U_{Nqn}}\right)$$

where $U_{DC}$ is the voltage at the capacitive energy store 3 and where $\omega = 2\pi F_{nom}$ and $F_{nom}$ is the nominal frequency of the electrical AC voltage supply system 2, for example $F_{nom} = 50$ Hz in the case of a customary electrical interconnected AC voltage grid or $F_{nom} = 16\frac{2}{3}$ Hz in the case of an electrical railroad AC voltage grid. For determining the phase angle ωt, the drive device 4 can comprise a phase locked loop.

The converter unit 1 can follow the phase voltages $U_{Na}$, $U_{Nb}$, $U_{Nc}$, in particular even if asymmetrical phase voltages $U_{Na}$, $U_{Nb}$, $U_{Nc}$ are present, that is to say that the reference voltages $u^*_{Na}$, $u^*_{Nb}$, $u^*_{Nc}$ correspond to the phase voltages $U_{Na}$, $U_{Nb}$, $U_{Nc}$. In the Park-Clarke reference system (dq reference system) the d component of the Park-Clarke transformation of the reference voltages $u^*_d$ and the q component of the Park-Clarke transformation of the reference voltages $u^*_q$ result as $$u^*_d = m \cdot \cos(\theta) \cdot U_{DC}/2$$

$$u^*_q = m \cdot \sin(\theta) \cdot U_{DC}/2$$

By means of the inverse Park-Clarke transformation, that is to say by inverse transformation into the time domain, the reference voltages $u^*_{Na}$, $u^*_{Nb}$, $u^*_{Nc}$ then result as $$u^*_{Na} = (m \cdot \cos(\theta) \cdot U_{DC}/2) \cdot \sin(\omega t) + (m \cdot \sin(\theta) \cdot U_{DC}/2) \cdot \cos(\omega t)$$

$$u^*_{Nb} = \sqrt{3} \cdot ((-m \cdot \cos(\theta) \cdot U_{DC}/2) \cdot \cos(\omega t) + (m \cdot \sin(\theta) \cdot U_{DC}/2) \cdot \sin(\omega t)) - ((m \cdot \cos(\theta) \cdot U_{DC}/2) \cdot \sin(\omega t) + (m \cdot \sin(\theta) \cdot U_{DC}/2) \cdot \cos(\omega t))$$

$$u^*_{Nc} = -\sqrt{3} \cdot ((-m \cdot \cos(\theta) \cdot U_{DC}/2) \cdot \cos(\omega t) + (m \cdot \sin(\theta) \cdot U_{DC}/2) \cdot \sin(\omega t)) - ((m \cdot \cos(\theta) \cdot U_{DC}/2) \cdot \sin(\omega t) + (m \cdot \sin(\theta) \cdot U_{DC}/2) \cdot \cos(\omega t))$$

The reference voltages $u^*_{Na}$, $u^*_{Nb}$, $u^*_{Nc}$ are formed in particular in the drive device 4, in particular by calculation.

The d component of the Park-Clarke transformation of the positive sequence of the phase voltages $U_{Ndp}$, the q component of the Park-Clarke transformation of the positive sequence of the phase voltages $U_{Nqp}$, the d component of the Park-Clarke transformation of the negative sequence of the phase voltages $U_{Ndn}$ and the q component of the Park-Clarke transformation of the negative sequence of the phase voltages $U_{Nqn}$ can be formed in each case from the d component of the Park-Clarke transformation of the phase voltages $U_{Nd}$ and from the q component of the Park-Clarke transformation of the phase voltages $U_{Nq}$. The formation is effected in particular in the drive device 4, and in particular by calculation as follows:

$$U_{Ndp} = U_{Nd} - Re(U_{Cr})$$

$$U_{Nqp} = U_{Nq} - Im(U_{Cr})$$

$$U_{Ndn} = Re(U_{Cr} \cdot e^{j2\omega t})$$

$$U_{Nqn} = Im(U_{Cr} \cdot e^{j2\omega t})$$

$$U_{Cr} = \left( \frac{U_{Nd} - U_{Ndt1}}{2 \cdot \sin(\omega t1)} + j \frac{U_{Nq} - U_{Nqt1}}{2 \cdot \sin(\omega t1)} \right) \cdot e^{j(\frac{\pi}{2} - \omega t1)}$$

where $U_{Ndt1}$ is the d component of the Park-Clarke transformation of the phase voltages $U_{Nd}$ delayed by the time duration $t1$, and $U_{Nqt1}$ is the q component of the Park-Clarke transformation of the phase voltages $U_{Nq}$ delayed by the time duration $t1$. The time duration $t1$ can be chosen with the order of magnitude of $$t1 = \frac{1}{4} \cdot \frac{1}{F_{nom}}.$$

For the sake of completeness it should be mentioned that, in particular in the case of asymmetrical phase voltages $U_{Na}$, $U_{Nb}$, $U_{Nc}$, these asymmetrical phase voltages $U_{Na}$, $U_{Nb}$, $U_{Nc}$ can be decomposed into a positive sequence of the phase voltages $U_{Np}$ (positive reference system) and into a negative sequence of the phase voltages $U_{Nn}$ (negative reference system), which then generally result as follows as:

$$U_{Np} = U_{Ndp} + jU_{Nqp}$$

$$U_{Nn} = U_{Cr} \cdot e^{j2\omega t}$$

The phase voltages $U_{Na}$, $U_{Nb}$, $U_{Nc}$ themselves are defined as follows:

$$U_{Na} = U_{Na,A} \cdot \sin(\omega t)$$

$$U_{Nb} = U_{Nb,A} \cdot \sin\left(\omega t - \frac{2\pi}{3}\right)$$

$$U_{Nc} = U_{Nc,A} \cdot \sin\left(\omega t - \frac{4\pi}{3}\right),$$

where the phase voltages $U_{Na}$, $U_{Nb}$, $U_{Nc}$ of the AC voltage supply system 2 are determined, in particular by measurement, and the sum of the phase voltages $U_{Na}$, $U_{Nb}$, $U_{Nc}$ yields zero, that is to say that the following holds true:

$$U_{Na} + U_{Nb} + U_{Nc} = 0$$

The d component of the Park-Clarke transformation of the phase voltages $U_{Nd}$ and the q component of the Park-Clarke transformation of the phase voltages $U_{Nq}$ then result as $$U_{Nd} = U_{Na} \cdot \cos(\omega t) + \frac{1}{\sqrt{3}} \cdot (U_{Nb} - U_{Nc}) \cdot \sin(\omega t)$$

$$U_{Nq} = U_{Na} \cdot \sin(\omega t) + \frac{1}{\sqrt{3}} \cdot (U_{Nb} - U_{Nc}) \cdot \cos(\omega t)$$

The d component of the Park-Clarke transformation of the phase voltages $U_{Nd}$ and the q component of the Park-Clarke transformation of the phase voltages $U_{Nq}$ are formed, in particular in the drive device 4, from the phase voltages $U_{Na}$, $U_{Nb}$, $U_{Nc}$ determined, in particular by calculation, wherein the d component of the Park-Clarke transformation of the phase voltages $U_{Nd}$ and the q component of the Park-Clarke transformation of the phase voltages $U_{Nq}$ are then used, as already explained above, for forming the d component of the Park-Clarke transformation of the positive sequence of the phase voltages $U_{Ndp}$, the q component of the Park-Clarke transformation of the positive sequence of the phase voltages $U_{Nqp}$, the d component of the Park-Clarke transformation of the negative sequence of the phase voltages $U_{Ndn}$ and the q component of the Park-Clarke transformation of the negative sequence of the phase voltages $U_{Nqn}$.

It should be noted at this juncture that the positive sequence of the phase voltages $U_{Np}$ has positive coordinates in the positive reference system and an angular velocity $\omega$ and the negative sequence of the phase voltages $U_{Nn}$ has positive coordinates in the negative reference system and an angular velocity $-\omega$. With the positive sequence of the phase voltages $U_{Np}$ and the negative sequence of the phase voltages $U_{Nn}$, it is possible to write the total phase voltage $$U_{Nd} + jU_{Nq}$$

in the positive reference system with the d component of the Park-Clarke transformation of the phase voltages $U_{Nd}$ and the q component of the Park-Clarke transformation of the phase voltages $U_{Nq}$ as follows:

$$U_{Nd} + jU_{Nq} = U_{Np} + e^{-2j\omega t} \cdot U_{Nn}$$

$$\Leftrightarrow$$

$$U_{Nd} + jU_{Nq} = U_{Ndp} + jU_{Nqp} + (\cos(2\omega t) - j\sin(2\omega t)) \cdot (U_{Ndn} + jU_{Nqn})$$

$$\Leftrightarrow$$

$$U_{Nd} + jU_{Nq} = U_{Ndp} + \cos(2\omega t) \cdot U_{Ndn} + \sin(2\omega t) \cdot U_{Nqn} + j(U_{Nqp} + \cos(2\omega t) \cdot U_{Nqn} - \sin(2\omega t) \cdot U_{Ndn})$$

where the term $$e^{-2j\omega t} \cdot U_{Nn}$$

denotes the coordinates of the negative sequence of the phase voltages $U_{Nn}$ in the positive reference system which rotate at twice an angular velocity $\omega$.

The formation of the reference voltages $u^*_{Na}$, $u^*_{Nb}$, $u^*_{Nc}$, the formation of the periodic modulation index $m(t)$ and the formation of the periodic modulation angle $\theta(t)$ can be effected continuously, whereby the most up-to-date values of the reference voltages $u^*_{Na}$, $u^*_{Nb}$, $u^*_{Nc}$, of the periodic modulation index $m(t)$ and of the periodic modulation angle $\theta(t)$ are always present. The formation of the d component of the Park-Clarke transformation of the positive sequence of the phase voltages $U_{Ndp}$, the formation of the q component of the Park-Clarke transformation of the positive sequence of the phase voltages $U_{Nqp}$, the formation of the d component of the Park-Clarke transformation of the negative sequence of the phase voltages $U_{Ndn}$ and the formation of the q component of the Park-Clarke transformation of the negative sequence of the phase voltages $U_{Nqn}$ can also be effected continuously. Furthermore, the determination of the phase voltages $U_{Na}$, $U_{Nb}$, $U_{Nc}$ of the AC voltage supply system 2 is effected continuously, such that it is always possible to reckon with the most up-to-date values. Furthermore, the formation of the d component of the Park-Clarke transformation of the phase voltages $U_{Nd}$ and the formation of the q component of the Park-Clarke transformation of the phase voltages $U_{Nq}$ can likewise be effected continuously.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Converter unit
2 Electrical AC voltage supply system
3 Capacitive energy store
4 Drive device
5 Calculation unit
6 Assignment unit

What is claimed is:

1. A method for operating a converter circuit, wherein the converter circuit has a converter unit having a multiplicity of drivable power semiconductor switches and the converter unit is connected to an electrical AC voltage supply system on the AC voltage side, in which the drivable power semiconductor switches are driven by means of a drive signal (S) formed from reference voltages ($u^*_{Na}$, $u^*_{Nb}$, $u^*_{Nc}$), wherein the reference voltages ($u^*_{Na}$, $u^*_{Nb}$, $u^*_{Nc}$) are formed from a periodic modulation index (m(t)) and from a periodic modulation angle ($\theta(t)$), and wherein the periodic modulation index (m(t)) and the periodic modulation angle ($\theta(t)$) are formed in each case from the d component of the Park-Clarke transformation of the positive sequence of the phase voltages ($U_{Ndp}$), from the q component of the Park-Clarke transformation of the positive sequence of the phase voltages ($U_{Nqp}$), from the d component of the Park-Clarke transformation of the negative sequence of the phase voltages ($U_{Ndn}$) and from the q component of the Park-Clarke transformation of the negative sequence of the phase voltages ($U_{Nqn}$)

wherein $$m(t) = \frac{\sqrt{(U_{Ndp} + \cos(2\omega t) \cdot U_{Ndn} + \sin(2\omega t) \cdot U_{Nqn})^2 + (U_{Nqp} + \cos(2\omega t) \cdot U_{Nqn} - \sin(2\omega t) \cdot U_{Ndn})^2}}{U_{DC}/2}$$

-continued $$\theta(t) = \arctan\left(\frac{U_{Nqp} + \cos(2\omega t) \cdot U_{Nqn} - \sin(2\omega t) \cdot U_{Ndn}}{U_{Ndp} + \cos(2\omega t) \cdot U_{Ndn} + \sin(2\omega t) \cdot U_{Nqn}}\right)$$

wherein $\omega$ is the angle frequency in dependency of nominal frequency of the electrical AC voltage supply system and $U_{DC}$ is the voltage at a capacitive energy store.

2. The method as claimed in claim 1, wherein the d component of the Park-Clarke transformation of the positive sequence of the phase voltages ($U_{Ndp}$), the q component of the Park-Clarke transformation of the positive sequence of the phase voltages ($U_{Nqp}$), the d component of the Park-Clarke transformation of the negative sequence of the phase voltages ($U_{Ndn}$) and the q component of the Park-Clarke transformation of the negative sequence of the phase voltages ($U_{Nqn}$) are formed in each case from the d component of the Park-Clarke transformation of the phase voltages ($U_{Nd}$) and from the q component of the Park-Clarke transformation of the phase voltages ($U_{Nq}$).

3. The method as claimed in claim 2, wherein the formation of the d component of the Park-Clarke transformation of the positive sequence of the phase voltages ($U_{Ndp}$), the formation of the q component of the Park-Clarke transformation of the positive sequence of the phase voltages ($U_{Nqp}$), the formation of the d component of the Park-Clarke transformation of the negative sequence of the phase voltages ($U_{Ndn}$) and the formation of the q component of the Park-Clarke transformation of the negative sequence of the phase voltages ($U_{Nqn}$) are effected continuously.

4. The method as claimed in claim 2, wherein the phase voltages ($U_{Na}$, $U_{Nb}$, $U_{Nc}$) of the AC voltage supply system are determined, and wherein the d component of the Park-Clarke transformation of the phase voltages ($U_{Nd}$) and the q component of the Park-Clarke transformation of the phase voltages ($U_{Nq}$) are formed from the phase voltages ($U_{Na}$, $U_{Nb}$, $U_{Nc}$) determined.

5. The method as claimed in claim 4, wherein the determination of the phase voltages ($U_{Na}$, $U_{Nb}$, $U_{Nc}$) of the AC voltage supply system is effected continuously, and the formation of the d component of the Park-Clarke transformation of the phase voltages ($U_{Nd}$) and the formation of the q component of the Park-Clarke transformation of the phase voltages ($U_{Nq}$) are effected continuously.

6. The method as claimed in claim 1, wherein the formation of the reference voltages ($u^*_{Na}$, $u^*_{Nb}$, $u^*_{Nc}$) is effected continuously, and wherein the formation of the periodic modulation index (m(t)) and the formation of the periodic modulation angle ($\theta(t)$) are effected continuously.

7. The method as claimed in claim 3, wherein the phase voltages ($U_{Na}$, $U_{Nb}$, $U_{Nc}$) of the AC voltage supply system are determined, and wherein the d component of the Park-Clarke transformation of the phase voltages ($U_{Nd}$) and the q component of the Park-Clarke transformation of the phase voltages ($U_{Nq}$) are formed from the phase voltages ($U_{Na}$, $U_{Nb}$, $U_{Nc}$) determined.

8. The method as claimed in claim 5, wherein the formation of the reference voltages ($u^*_{Na}$, $u^*_{Nb}$, $u^*_{Nc}$) is effected continuously, and wherein the formation of the periodic modulation index (m(t)) and the formation of the periodic modulation angle ($\theta(t)$) are effected continuously.

9. A converter circuit arrangement, comprising:
  a converter unit having a multiplicity of drivable power semiconductor switches, the drivable power semiconductor switches being driven by a drive signal (S) formed from reference voltages ($u^*_{Na}$, $u^*_{Nb}$, $u^*_{Nc}$), and
  an electrical AC voltage supply system connected to an AC voltage side of the converter unit,
  wherein the reference voltages ($u^*_{Na}$, $u^*_{Nb}$, $u^*_{Nc}$) are formed from a periodic modulation index (m(t)) and from a periodic modulation angle (θ(t)), and
  wherein the periodic modulation index (m(t)) and the periodic modulation angle (θ(t)) are formed in each case from the d component of the Park-Clarke transformation of the positive sequence of the phase voltages ($U_{Ndp}$), from the q component of the Park-Clarke transformation of the positive sequence of the phase voltages ($U_{Nqp}$), from the d component of the Park-Clarke transformation of the negative sequence of the phase voltages ($U_{Ndn}$) and from the q component of the Park-Clarke transformation of the negative sequence of the phase voltages ($U_{Nqn}$); and
  wherein $$m(t) = \frac{\sqrt{(U_{Ndp} + \cos(2\omega t) \cdot U_{Ndn} + \sin(2\omega t) \cdot U_{Nqn})^2 + (U_{Nqp} + \cos(2\omega t) \cdot U_{Nqn} - \sin(2\omega t) \cdot U_{Ndn})^2}}{U_{DC}/2}$$

$$\theta(t) = \arctan\left(\frac{U_{Nqp} + \cos(2\omega t) \cdot U_{Nqn} - \sin(2\omega t) \cdot U_{Ndn}}{U_{Ndp} + \cos(2\omega t) \cdot U_{Ndn} + \sin(2\omega t) \cdot U_{Nqn}}\right) \text{ and}$$

wherein ω is the angle frequency in dependency of nominal frequency of the electrical AC voltage supply system and $U_{DC}$ is the voltage at a capacitive energy store.

* * * * *